United States Patent
Ozawa et al.

(10) Patent No.: US 7,859,129 B2
(45) Date of Patent: Dec. 28, 2010

(54) VEHICLE ANTITHEFT DEVICE AND CONTROL METHOD OF A VEHICLE

(75) Inventors: Takao Ozawa, Toyota (JP); Shinichi Tanaka, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 914 days.

(21) Appl. No.: 10/540,275

(22) PCT Filed: Dec. 25, 2003

(86) PCT No.: PCT/JP03/16779
§ 371 (c)(1),
(2), (4) Date: Apr. 22, 2008

(87) PCT Pub. No.: WO2004/058548
PCT Pub. Date: Jul. 15, 2004

(65) Prior Publication Data
US 2008/0203815 A1    Aug. 28, 2008

(30) Foreign Application Priority Data
Dec. 26, 2002    (JP) .............................. 2002-378291

(51) Int. Cl.
B60R 25/10    (2006.01)
(52) U.S. Cl. ..................... 307/10.2; 340/5.72
(58) Field of Classification Search ............... 340/5.72, 340/426.1, 426.28, 825.72, 539.1, 426.11–426.13, 340/825.69, 426.36, 426.17; 307/9.1–10.6; 180/287
See application file for complete search history.

(56) References Cited

U.S. PATENT DOCUMENTS

| 5,264,825 | A | * | 11/1993 | Schneider | ............... 340/426.25 |
| 5,958,081 | A | * | 9/1999 | Lemense et al. | ............. 714/811 |
| 6,639,511 | B2 | | 10/2003 | Haruna et al. | |
| 6,822,559 | B2 | * | 11/2004 | Hofbeck et al. | ........... 340/426.1 |
| 7,098,791 | B2 | * | 8/2006 | Okada | ...................... 340/568.1 |
| 2002/0003472 | A1 | | 1/2002 | Haruna et al. | |

FOREIGN PATENT DOCUMENTS

| JP | 9-58413 | 3/1997 |
| JP | 2000-71940 | 3/2000 |
| JP | 2002-70698 | 3/2002 |
| JP | 2002-79911 | 3/2002 |

* cited by examiner

Primary Examiner—Albert W Paladini
(74) Attorney, Agent, or Firm—Kratz, Quintos & Hanson, LLP

(57) ABSTRACT

When a remote start of an engine using a predetermined transmitter is performed, a security regarding theft of a vehicle can be prevented form being significantly deteriorated. The vehicle has a remote engine starter for remotely start an engine and a vehicle antitheft device for activating an alarm when there is a possibility of occurrence of vehicle theft. The remote engine starter and the vehicle antitheft device are connected to each other through a communication line. In a case where an engine start signal is supplied from the transmitter, the remote engine starter is caused to supply a start signal to the vehicle antitheft device through the communication line before causing a contact point closing signal to be supplied to an ignition relay. When the start signal is supplied to the vehicle antitheft device, preventing apparatus, only the security function regarding conditions of no-insertion of an ignition key and an ignition ON is cancelled to be an unvigilant state, and the security function regarding other conditions is maintained to be a vigilant state.

11 Claims, 7 Drawing Sheets

VEHICLE ANTITHEFT DEVICE AND CONTROL METHOD OF A VEHICLE

TECHNICAL FIELD

The present invention relates to vehicle antitheft devices and control method of a vehicle and, more particularly, to a vehicle antitheft device and a control method of a vehicle that prevent theft in accordance with a plurality of theft modes, the vehicle having a remote start device which starts an engine when a start signal radio-transmitted from a predetermined transmitter is received.

BACKGROUND ART

Conventionally, there is known an in-vehicle device having a remote controller for performing remotely an engine start by a starter (for example, refer to Japanese Laid-Open Patent application No. 2002-70698). In this apparatus, when a start signal from a remote controller is received by a vehicle side, a security function of an in-vehicle security device is cancelled and, thereafter, the engine is started by the starter. Therefore, according to the above-mentioned conventional apparatus, the security function can be cancelled before the engine is started, and, thereby, it becomes possible to avoid an execution of warning or the like due to an activation of the security function caused by the engine start according to the remote control.

As the in-vehicle security function, other than that relates to the engine start, there exists one which relates to an intrusion into a vehicle interior to deal with break-opening of a vehicle door or breaking of a door glass. In a case where a security device having a plurality of security functions is mounted on a vehicle, it becomes impossible to activate the security function regarding an intrusion into a vehicle interior if all security functions are cancelled when an engine start according to a remote control is performed as in the above-mentioned device, and, thereby, there may occur a problem in that an antitheft property of the vehicle is deteriorated during a period from the execution of the remote control operation until a vehicle occupant actually gets on the vehicle.

DISCLOSURE OF THE INVENTION

It is a general object of the present invention to provide an improved and useful vehicle antitheft device in which the above-mentioned problems are eliminated.

A more specific object of the present invention is to provide a vehicle antitheft device and a control method of a vehicle that is capable of preventing a security regarding vehicle theft from being significantly deteriorated when a remote start of an engine using a remote control is performed.

In order to achieve the above-mentioned objects, there is provided according to one aspect of the present invention a vehicle antitheft device mounted to a vehicle equipped with a remote start device for starting an engine when a start signal radio-transmitted from a predetermined transmitter is received by an in-vehicle receiver, comprising: means for preventing the vehicle from being stolen in accordance with a plurality of theft modes, respectively; and partly stopping means for stopping a theft preventing function corresponding to some of the theft modes before an engine start by the remote start device is started when the start signal is received by the in-vehicle receiver.

Additionally, there is provided according to another aspect of the present invention a control method of a vehicle equipped with a remote start device for starting an engine when a start signal radio-transmitted from a predetermined transmitter is received by an in-vehicle receiver and an antitheft device for preventing theft of the vehicle in accordance with a plurality of theft modes, respectively, comprising: a first step of stopping a theft preventing function corresponding to some of the theft modes by the antitheft device when the start signal is received by the in-vehicle receiver; and a second step of starting an engine start by the remote start device after the antitheft function corresponding to the part of the theft modes is stopped by the antitheft device.

In above-mentioned invention, the antitheft device prevents theft of the vehicle in accordance with the plurality of theft modes, respectively. When the start signal radio-transmitted from the predetermined transmitter is received by the in-vehicle receiver, the antitheft function corresponding to the part of the theft modes by the antitheft device is stopped first, and, thereafter, a remote engine start is started. In the above-mentioned structure, if the part of the theft modes according which the function stop is performed is set as one regarding an engine start, when a remote engine start is performed using the predetermined transmitter, a situation where the antitheft function is activated due to the engine start can be avoided and a vigilant state according to an antitheft function corresponding to a theft mode other than the above-mentioned part of the theft modes can be maintained. Therefore, according to the present invention, in the case where a remote engine start is performed using the predetermined transmitter, the security regarding theft of the vehicle can be prevented from being significantly deteriorated.

Additionally, there is provided according to another aspect of the present invention a vehicle antitheft device mounted to a vehicle equipped with a remote start device for starting an engine when a start signal radio-transmitted from a predetermined transmitter is received by an in-vehicle receiver, comprising: preventing means for preventing the vehicle from being stolen in accordance with a plurality of theft modes, respectively; and partly stopping means for stopping, after an occurrence of vehicle theft according to some of the theft modes is detected for at least a first time, an antitheft function corresponding to the part of the theft modes for a predetermined time period.

In the above-mentioned invention, the antitheft device prevents theft of the vehicle in accordance with the plurality of theft modes, respectively. If an occurrence of vehicle theft according to some of the theft modes is detected for at least a first time, thereafter, an antitheft function corresponding to the part of the theft modes is stopped for a predetermined time period. In the above-mentioned structure, if the part of the theft modes according which the function is stopped for the predetermined time period s set as one regarding an engine start, when a remote engine start is performed using the predetermined transmitter, a situation where the antitheft function is activated due to the engine start can be avoided and a vigilant state according to an antitheft function corresponding to a theft mode other than the above-mentioned part of the theft modes can be maintained. Therefore, according to the present invention, even in the case where the remote start device and the antitheft device are not connected for communication, when a remote engine start is performed using the predetermined transmitter, the security regarding theft of the vehicle can be prevented from being significantly deteriorated.

In the vehicle antitheft device according to the above-mentioned invention, the antitheft function stopped by the partly stopping means may be a function to give warning when detection is made that an ignition is turned on in a state where a key is not inserted in an ignition key cylinder.

Additionally, the vehicle may be equipped with a remote stop device that stops the engine when a stop signal radio-transmitted from said predetermined transmitter is received by said in-vehicle receiver, and the vehicle antitheft device may be equipped with restoring means for restoring the antitheft function corresponding to said part of the theft modes after an engine stop by said remote stop device is performed when said stop signal is received by said in-vehicle receiver.

Further, in the control method of a vehicle according to the above-mentioned invention, the vehicle may be equipped with a remote stop device that stops the engine when a stop signal radio-transmitted from the predetermined transmitter is received by said in-vehicle receiver, and the control method may includes: a third step of performing an engine stop by the remote stop device when the stop signal is received by the in-vehicle receiver; and a fourth step of restoring the antitheft function corresponding to the part of the theft modes by the antitheft device after an engine stop by the remote stop device is performed by the third step. Having such steps is effective, when a remote engine stop using the predetermined transmitter is performed, for avoiding a situation where the antitheft function is activated due to the engine start.

When the stop signal radio-transmitted from the predetermined transmitter is received by the in-vehicle receiver, first, an engine stop by the remote stop apparatus is performed, and, thereafter, the antitheft function corresponding to the part of the theft modes by the antitheft device is restored. In the above-mentioned structure, when the remote engine stop using the predetermined transmitter is performed, a situation where the antitheft function is activated due to the engine stop is avoided.

Other objects, features and advantages of the present invention will become more apparent from the following detailed description when read in conjunction with the accompanying drawings.

BEST MODE FOR CARRYING OUT THE INVENTION

Figure 1:
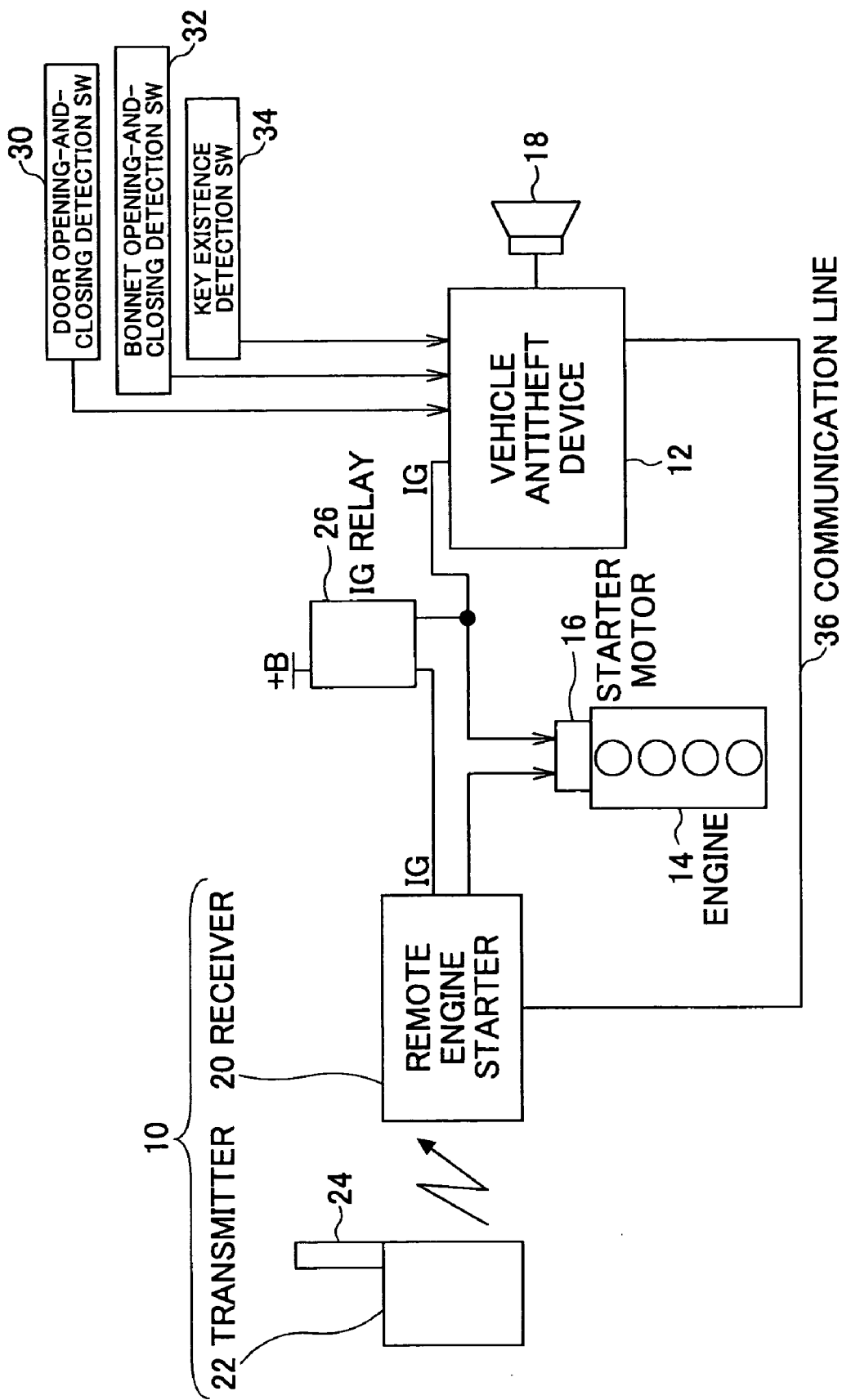
FIG. 1 is a constitutive diagram of a system according to a first embodiment of the present invention.

FIG. 1 is a constitutive diagram of a system mounted on a vehicle according to a first embodiment of the present invention. As shown in FIG. 1, in the present embodiment, the vehicle is equipped with a remote engine starter 10 and a vehicle antitheft device 12. The remote engine starter 10 is connected with a starter motor 16 which performs a start of an engine 14, which is a power of the vehicle. The remote engine starter 10 is a device that causes the engine 14 of the vehicle by actuation of the starter motor 16 remotely even from a position away from the vehicle by, for example, about 300 m. Additionally, the vehicle antitheft device 12 is connected with an alarm 18 such as a horn or a lamp. The vehicle antitheft device 12 is a device that prevents theft by activating the alarm 18 when there is a possibility of occurrence of the theft of the vehicle.

The remote engine starter 10 is equipped with a receiver 20 mounted on the vehicle and a portable transmitter (hereinafter, simply referred to as a transmitter) generally carried by a vehicle occupant. The transmitter 22 has an operation switch (not shown in the figure) for starting/stopping the engine 14 and a transmission antenna 24 so as to radio-transmit an engine start signal or an engine stop signal toward the receiver 20 of the vehicle corresponding to the transmitter 22 through the transmission antenna 24 when the operation switch is operated. The receiver 20 has a reception antenna so as to receive a signal transmitted from the transmitter 22.

The remote engine starter 10 is also connected with an ignition (IG) relay 26 connected to a battery power source (+B). The ignition relay 26 connects to the battery power source by closing a contact point and interrupts the connection by opening the contact point in accordance with signals from the remote engine starter 10. The remote engine starter 10 supplies the signal for closing the contact point toward the ignition relay 26 when the engine start signal from the transmitter 22 is received by the receiver 20, and supplies the signal for opening the contact point toward the ignition relay 26 when the engine stop signal from the transmitter 22 is received by the receiver 20.

The above-mentioned starter motor 16 is connected to the contact point of the ignition relay 26. Moreover, as mentioned above, the starter motor 16 is directly connected to the remote engine starter 10. The starter motor 16 electrically starts the engine when a signal for starting the engine 14 if supplied from the remote engine starter 10 in a state where a battery power is supplied by the contact point of the ignition relay 26 being closed.

The vehicle also has an ignition key cylinder (not shown in the figure) into which an ignition key carried by a vehicle occupant is inserted. Attached to the ignition key cylinder are an accessory switch for turning on and off an electric power source of in-vehicle equipment, an ignition switch for turning on and off an electric power source of ignition plugs, and a starter switch for turning on and off an electric power source of the starter motor 16 (each switch is not shown in the figure). Those various kinds of switches are turned on and off by the ignition key inserted in the ignition key cylinder being rotationally operated. At this time, turning on of those various kinds of switches is performed in an order of the accessory switch→the ignition switch→the starter switch, and turning off is performed in a reverse order.

The ignition switch is connected to the above-mentioned ignition relay 26. The ignition relay 26 connects to the battery power source by closing the contact point in response to an on-operation of the ignition switch, other than the signal from the remote engine starter 10, and interrupts the connection by opening the contact point in response to an off-operation of the ignition switch. Moreover, the starter switch is connected to the above-mentioned starter motor 16. The starter motor 16 causes to start the engine 14 even when an on-signal from the starter switch is supplied in a stated where a battery power source is supplied due to the contact point of the ignition relay 26 being closed.

In the above-mentioned structure, by rotationally operating the ignition key while inserting the ignition key into the ignition key cylinder, the battery power source is caused to be connected to the starter motor 16 through the ignition relay 26 so as to start the engine 14 by actuation of the starter motor 16. Additionally, even in a state where a vehicle occupant does not get on the vehicle, by radio-transmitting the engine start signal toward the receiver 20 of the remote engine starter 10 from the transmitter 22 by an operation on the transmitter 22 located at a position remote from the vehicle (for example, inside one's home), the battery power source is caused to be connected to the starter motor 16 through the ignition relay 26 using the remote engine starter 10 so as to start the engine 14 by actuation of the starter motor 16. Thereby, the vehicle can be warmed up before driving the vehicle without a vehicle occupant getting on the vehicle, and the vehicle occupant can wait inside a house until the interior of the vehicle becomes a desired temperature by activating a vehicle air conditioner.

In the present embodiment, the vehicle antitheft device 12 is connected with a door opening-and closing detection switch 30 provided to each vehicle door and a luggage door, a bonnet opening-and-closing detection switch 32 provided to a vehicle bonnet, and a key existence detection switch 34 provided to the ignition key cylinder. The door opening-and-closing detection switch 30 outputs a signal according to an opening-and-closing state of each vehicle door and the luggage door. The bonnet opening-and-closing detection switch 32 outputs a signal according to an opening-and-closing state of the vehicles bonnet. The key existence detection switch 34 outputs a signal according to whether or not the ignition key is inserted in the ignition key cylinder.

The output signals of the switches 30, 32 and 34 are supplied to the vehicle antitheft device 12, respectively. The vehicle antitheft device 12 detects an opening and closing state of each vehicle door, the luggage door and the vehicle bonnet based on the output signal of each of the switches 30, 32 and 34, and determines whether or not the ignition key is inserted in the ignition key cylinder.

The vehicle antitheft device 12 is also connected to the contact point of the ignition relay 26. The vehicle antitheft device 12 determines whether or not it is set to an ignition-on where a power of the starter motor 16 and the like can be turned on based on the signals supplied by the ignition relay 26. Specifically, when a high-level signal according to the battery power source due to the contact point of the ignition relay 26 being closed is supplied, a determined is made that the ignition-on state is set where the starter motor 16 can be driven.

In the vehicle antitheft device 12, first, a state where an activation of the alarm 18 is prohibited (hereinafter, referred to as an unvigilant state) is achieved as there is no possibility of occurrence of vehicle theft when the vehicle doors are shifted from a locked state to an unlocked state by the ignition key carried by a vehicle occupant being inserted into a door key cylinder of a vehicle door and being operated or by a code collation between a transmitter (not shown in the figure) of a wireless door locking/unlocking device and an in-vehicle equipment through a radio communication being completed.

If a state where the ignition key is not inserted into the ignition key cylinder and all of the vehicle doors, the luggage door and the vehicle bonnet are closed and locked continues for a predetermined time period (for example, 30 seconds), a state (hereinafter, referred to as a vigilant state) where an activation of the alarm 18 is permitted is achieved.

In the above-mentioned vigilant state, the alarm 18 is activated, a horn is intermittently sounded, and a hazard warning lamp is blinked (warning state) as there is a possibility of occurrence of vehicle theft 1) when a vehicle door or a luggage door is unlocked without the ignition key being inserted into the ignition key cylinder and without completion of the code collation between the transmitter (not shown in the figure) of the wireless door locking/unlocking device and a portable equipment (first theft mode); 2) when it is detected that each door or the vehicle bonnet is in an opened state by the door opening-and-closing detection switch 30 and the bonnet opening-and-closing detection switch 32 without each door being unlocked (second theft mode); or 3) when it is determined that it is set in an ignition-on state by a high-level signal being supplied from the ignition relay 26 in a state where it is determined by the key existence detection switch 34 that the ignition key is not inserted in the ignition key cylinder (third theft mode).

On the other hand, in the unvigilant state is achieved as there is no possibility of occurrence of vehicle theft when, in the vigilant state, a vehicle door is unlocked by the ignition key being inserted into the door key cylinder and being operated or completion of the code collation between the transmitter (not shown in the figure) of the wireless door locking/unlocking device and the portable equipment through a radio communication, or when it is determined an ignition-on state is set by the high-level signal being supplied from the ignition relay 26 in the state where the ignition key cylinder is inserted in the ignition key cylinder.

Therefore, according to the vehicle antitheft device 12 according to the present embodiment, the vehicle itself or an article present in the vehicle can be prevented from being stolen when any one of the conditions indicated in the above-mentioned 1) to 3) is established by the vehicle door, the luggage door or the bonnet door being unlocked or opened by a method other than a normal method and by the contact point of the ignition relay 26 being closed in the state where the ignition key is not inserted in the ignition key cylinder under a predetermined situation.

In the meantime, in the present embodiment, the vehicle is provided with a remote engine starter 10, which remotely drives the starter motor 16. Thus, according to the vehicle of the present invention, the engine 14 can be started by using the remote engine starter 10 without a vehicle occupant getting on the vehicle, that is, without insertion of the ignition key into the ignition key cylinder. When such an engine start is performed, the ignition-on state is achieved according to the output of the high-level signal by the ignition relay 26 in the state where the ignition key is not inserted in the ignition key cylinder. Thus, if the ignition-on according to the above-mentioned method is performed in the above-mentioned vigilant state, the condition indicated in the above-mentioned 3) is established despite that the engine start is performed by a normal method, and, thus, there may occur a problem in that alarming and warning is performed by the alarm 38 of the vehicle antitheft device 12 as the third theft mode occurs.

Thus, as a method of solving such a problem, is is considered to cancel all security functions so that the alarming according to the establishment of the conditions indicated in the above-mentioned 1) to 3) of the vehicle antitheft device 12 is not performed by causing the receiver 20 of the remote engine starter 10 and the vehicle antitheft device 12 to communicably connected with each other and supplying a predetermined signal to the vehicle antitheft device 12 before closing the contact point of the ignition relay 26 when the receiver 20 received the engine start signal from the transmitter 22. In this case, the security function of vehicle antitheft device 12 does not erroneously operate due to the engine start using the remote engine starter 10, thereby avoiding the above-mentioned problem.

However, since all the security functions are canceled when the remote engine start using the remote engine starter 10 is performed in the above-mentioned method, thereafter, there is no warning due to establishment of the conditions indicated in the above-mentioned 1) and 2) even in a case where, for example, a vehicle door is break-opened, and, as a result, the antitheft property of the vehicle is deteriorated during a period from an operation of the transmitter 22 is performed by a vehicle occupant and until the vehicle occupant actually gets on the vehicle.

The system of the present embodiment prevents significant deterioration of the antitheft property while avoiding an erroneous operation of the security function of the vehicle antitheft device 12 due to an engine start when the engine start is performed using the remote engine starter by avoiding the above-mentioned problem. Hereafter, a description will be given, with reference to FIG. 2 through FIG. 4, of the above-mentioned advantages according to the present embodiment.

Figure 2:
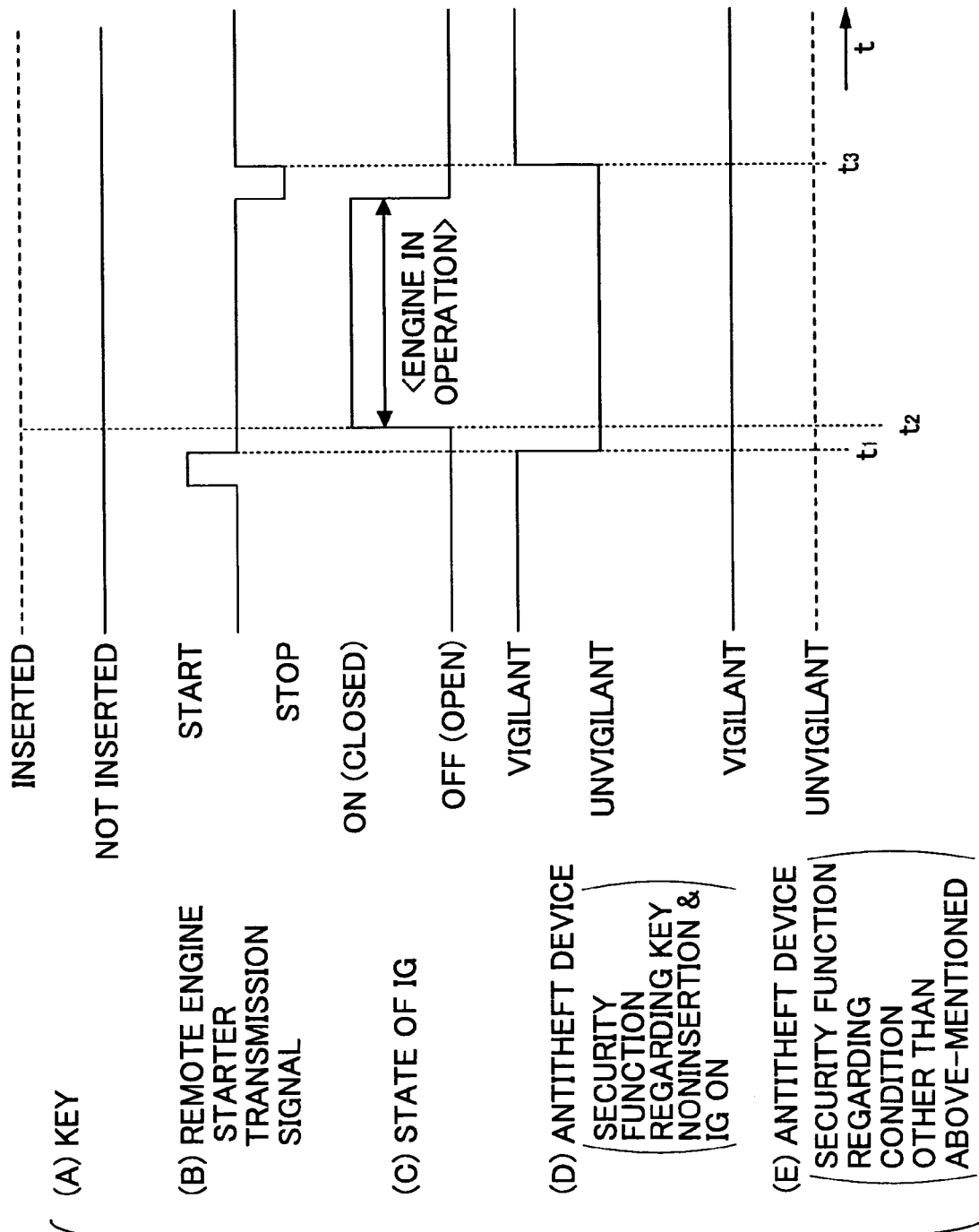
FIG. 2 is an operation time chart of a process which the system shown in FIG. 1 performs.

FIG. 2 is a diagram indicating an operation time chart of the system of the present embodiment. As shown in FIG. 1, in the present embodiment, the receiver 20 of the remote engine starter 10 and the vehicle antitheft device 12 are connected through the communication line 36. When the engine start signal from the transmitter 22 is received, the receiver 20 supplies a signal (hereinafter, referred to as a start signal) for canceling a predetermined security function towards the vehicle antitheft device 12 through the communication line 36 before supplying a signal for closing the contact point of the ignition relay 26.

The vehicle antitheft device 12 changes to the unvigilant state with respect to the activation of the alarm 18, that is, the activation of the alarm 18 corresponding to the third theft mode when the high-level signal is supplied from the ignition relay 26 in the state where the ignition key is not inserted in the ignition key cylinder by canceling the security function regarding the condition indicated in the above-mentioned 3) as indicted in FIGS. 2-(D) and (E) when (time t1 in FIG. 2) the start signal is supplied from the receiver 20 of the remote engine starter 10 through the communication line 36, and, on the other hand, maintain the vigilant state regarding the activation of the alarm 18 when the vehicle door, the luggage door or the vehicle bonnet is unlocked or opened by a method other than a normal method, that is, the activation of the alarm 18 corresponding to the first and second theft modes by maintaining the security function regarding the conditions indicated in the above-mentioned 1) and 2).

After the receiver 20 of the remote engine starter 10 supplies the start signal to the vehicle antitheft device 12, the receiver 20 supplied a signal for closing the contact point towards the ignition relay 26 by delaying a predetermined time. Upon the supply of the signal for closing the contact point from the receiver 20 (time t2 in FIG. 2) the ignition relay 26 supplies a high-level signal by the battery voltage to the vehicle antitheft device 12 by closing the contact point. Thus, the vehicle antitheft device 12 determines that the ignition-on state is set where the starter motor 16 can be driven by the closing of the ignition relay 26 after cancellation of the security function regarding the condition indicated in the above-mentioned 3).

In this structure, when the engine start using the remote engine starter 10 is performed, before the ignition-on by the ignition relay 26 is supplied to the vehicle antitheft device 12, the unvigilant state is achieved with respect to the activation of the alarm 18 when the high-level signal is supplied from the ignition relay 26 in the state where the ignition key is not inserted in the ignition key cylinder. For this reason, the situation where the alarm 18 is activated due to the engine start using the remote engine starter 10 can be avoided.

Moreover, in the above-mentioned structure, even when the unvigilant state is achieved with respect to the activation of the alarm 18 corresponding to the third theft mode by the engine start being performed using the remote engine starter 10, the vigilant state is maintained with respect to the activation of the alarm 18 when an injustice unlock or opened state of the vehicle door, the luggage door and the vehicle bonnet is set, that is, the activation of the alarm 18 corresponding to the first and second theft modes relating to the vehicle intrusion system. Thus, even when the engine start using the remote engine starter 10 is performed, alarming by the alarm 18 can be appropriately performed if an injustice intrusion into the vehicle during a period until the vehicle door is unlocked by a normal method thereafter.

Thus, according to the system of the present embodiment, when the remote engine start is performed using the remote engine starter 10, an erroneous activation of the alarm 18 due to such an engine start can be avoided, and the antitheft property of the vehicle can be maintained high during a period from a time when an operation of the transmitter 22 of the remote engine starter by a vehicle occupant is performed until the vehicle occupant actually gets on the vehicle by maintenance of the vigilant state by the alarm 18 corresponding to the vehicle intrusion system. Thus, it is possible to prevent the security with respect to the vehicle theft from being significantly deteriorated.

Moreover, in the present embodiment, when the engine stop signal is received after the engine start signal from the transmitter 22 is received, the receiver 20 of the remote engine starter 10 supplies the signal for returning the predetermined security function to the vehicle antitheft device by using the communication line 36 by delaying the predetermined time after supplying the signal for closing the contact point to the ignition relay 26. When the stop signal is supplied from the receiver 20 through the communication line 36 under the situation where the unvigilant state is achieved only for the activation of the alarm 18 corresponding to the third theft mode (time t3 in FIG. 2), the vehicle antitheft device 12 changes to the vigilant state with respect to the activation of the alarm 18 corresponding to the third theft mode by restoring the security function regarding the condition indicated in the above-mentioned 3) as shown in FIG. 2(D).

The receiver 20 of the remote engine starter 10 supplies a signal for opening the contact point to the ignition relay 26 before supplying the stop signal to the vehicle antitheft device 12. When the signal for opening the contact point is supplied from the receiver 20, the ignition relay 26 supplies a low-level signal, which indicates that an ignition-off is set, to the vehicle antitheft device 12 by opening the contact point. For this reason, the vehicle antitheft device 12 distinguishing that a state where the engine is not driven due to opening of the contact point of the ignition relay 26 is set, that is, the ignition-off is set, before the security function regarding the condition indicated in the above-mentioned 3) is restored.

In this structure, when an engine stop is performed using the remote engine starter 10 after an engine start is performed using the remote engine starter 10, the vigilant state with respect to the activation of the alarm 18 is achieved and restored when the high-level signal from the ignition relay 26 is supplied in a state where the ignition key is not inserted in the ignition key cylinder after the ignition-off by the ignition relay 26 is supplied to the vehicle antitheft device 12. Thus, a situation where the alarm is activated due to the engine stop using the remote engine starter 10 can be avoided.

Figure 3:
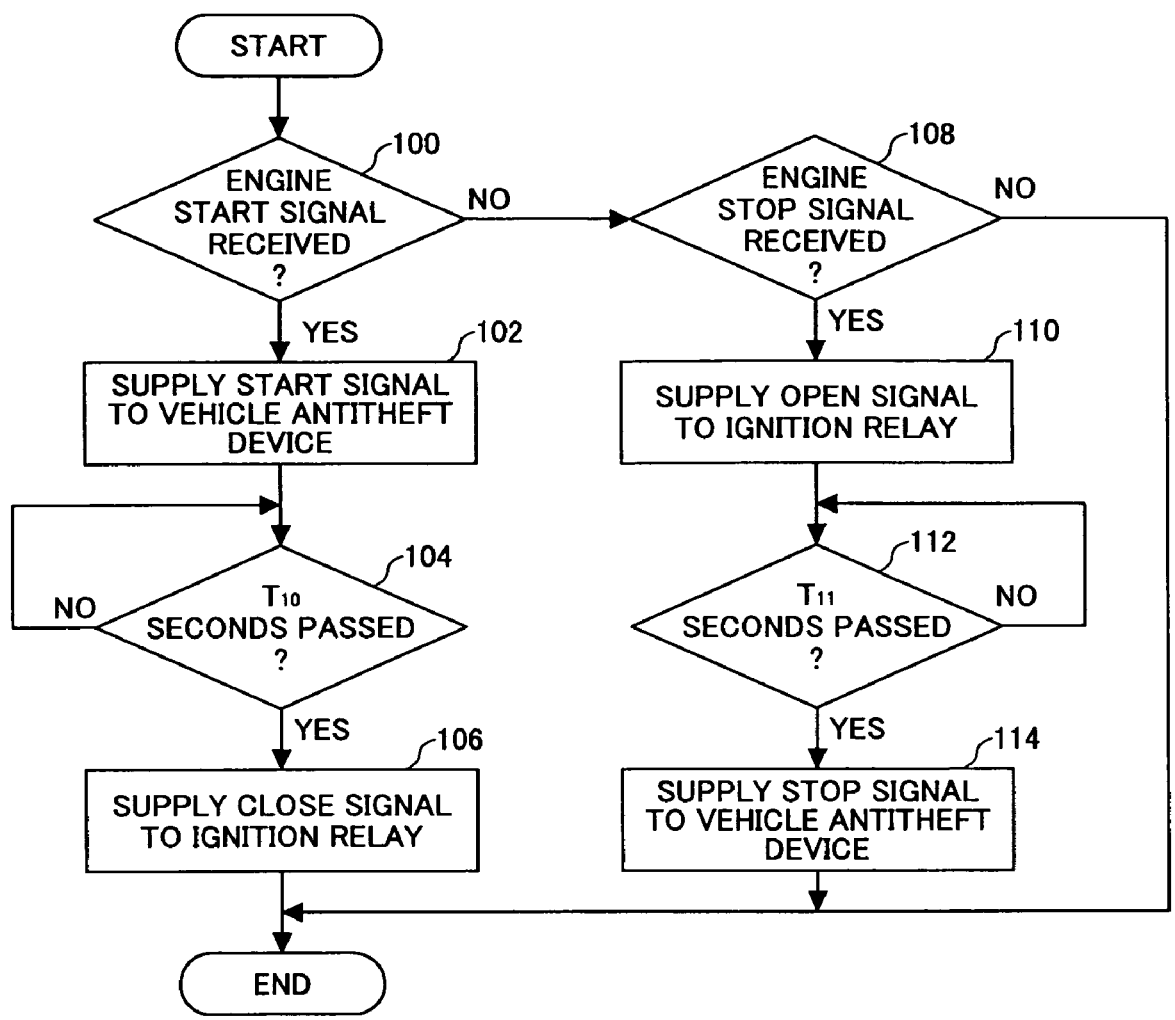
FIG. 3 is a flowchart of a control routine executed in a receiver of a remote engine starter.

FIG. 3 shows a flowchart of an example of a control routine which the receiver 20 of the remote engine starter 10 of the present embodiment performed so as to achieve the above-mentioned function. The routine shown in FIG. 3 is repeatedly started each time the process is ended. When the routine shown in FIG. 3 is started, first the process of step 100 is performed.

In step 100, it is determined whether or not the engine start signal form the receiver 22 is received. Consequently, if an affirmative determination is made, then, the process of step 102 is performed. In step 102, a process of supplying the start signal for canceling the security function regarding the condition indicated in the above-mentioned 3) to the vehicle antitheft device 12.

In step 104, after the start signal is supplied to the vehicle antitheft device 12 in the above-mentioned step 102, it is determined whether or not a predetermined time T10 passed. It should be noted that the predetermined time T10 is set at least as a minimum time necessary for the vehicle antitheft device 12 to cancel the security function regarding the condition indicated in the above-mentioned 3) after the receiver supplies the start signal to the vehicle antitheft device 12. The process of step 104 is repeatedly performed until it is determined that the predetermined time T10 has passed. Consequently, if it is determined that the predetermined time T10 has passed, then, the process of step 106 is performed.

In step 106, a process of supplying the signal for closing the contact point to the ignition relay 26 is performed. After the process of step 106 is performed, the ignition relay 26 supplies the high-level signal, which caused detection of an ignition-on, to the vehicle antitheft device 12 by closing the contact point. After the process of step 106 is completed, the routine at this time is ended.

On the other hand, if a negative determination is made in step 100, then, the process of step 108 is performed. In step 108, it is determined whether or not the engine stop signal from the transmitter 22 is received. Consequently, if an affirmative determination is made, then, the process of step 110 is performed. On the other hand, if a negative determination is made, the routine at this time is ended.

In step 110, a process of supplying the signal for opening the contact point to the ignition relay 26 is performed. After the process of step 110 is performed, the ignition relay 26 supplies the low-level signal, which causes detection of an ignition-off, to the vehicle antitheft device 12 by opening the contact point.

In step 112, it is determined whether or not a predetermined time T11 has passed after the contact opening signal is supplied to the ignition relay 26 in the above-mentioned step 110. It should be noted that the predetermined time T11 is set at least as a minimum time necessary for the vehicle antitheft device 12 to detect an ignition-off after the receiver 20 supplies the contact point opening signal to the ignition relay 26. The process of step 112 is repeatedly performed until it is determined that the predetermined time T11 has passed. Consequently, if it is determined that the predetermined time T11 has passed, then, the process of step 114 is performed.

In step 114, a process of supplying the stop signal for restoring the security function regarding the condition indicated in the above-mentioned 3) to the vehicle antitheft device 12 is performed. After the process of step 114 is ended, the routine at this time is ended.

According to the routine shown in FIG. 3, when the engine start signal from the transmitter 22 is received by the receiver 20 of the remote engine starter 10, the start signal is caused to be supplied to the vehicle antitheft device 12 and, thereafter, the unvigilant state is achieved with respect to the activation of the alarm 18 when the high-level signal is supplied from the ignition relay 26 in the state where the ignition key is not inserted in the ignition key cylinder in the vehicle antitheft device 12, and thereafter the contact closing signal can be caused to be supplied to the ignition relay 26.

Moreover, according to the routine shown in FIG. 3, when the engine stop signal from the transmitter 22 is received by the receiver 20 of the remote engine starter 10, the contact point opening signal is supplied to the ignition relay 26, and, thereafter, the stop signal can be supplied to the vehicle antitheft device 12 after an ignition-off is detected in the vehicle antitheft device 12.

Figure 4:
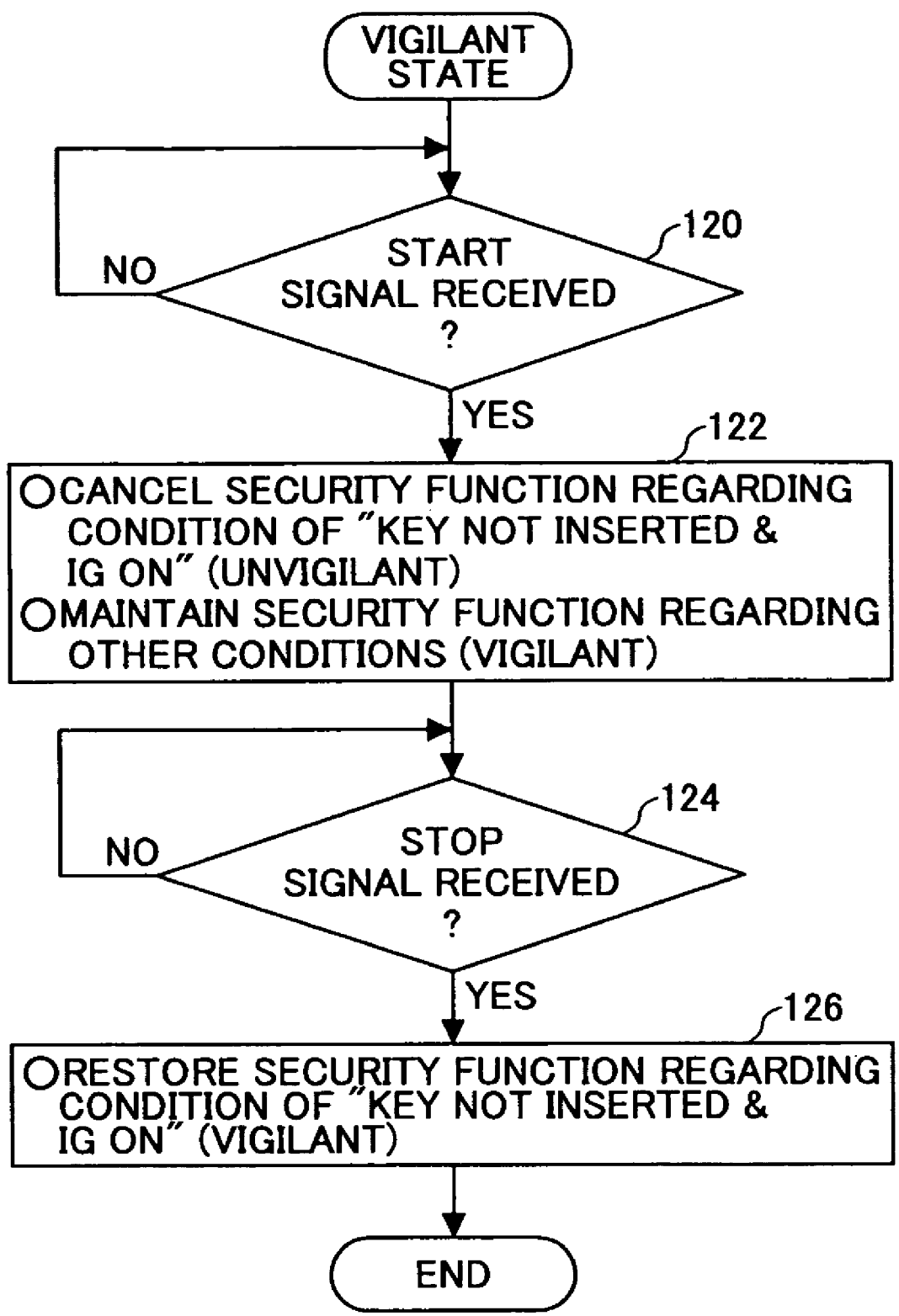
FIG. 4 is a flowchart of a control routine executed in a vehicle antitheft device.

FIG. 4 is a flowchart of an example of a control routine which the vehicle antitheft device 12 of the present embodiment executes when the vigilant state is achieved with respect to all security functions. The routine shown in FIG. 4 is repeatedly started each time the process is ended, and when the routine is started, the process of step 120 is performed first.

In step 120, it is determined whether or not the start signal from the receiver 20 of the remote engine starter 10 is received. The process of step 120 is repeatedly performed until an affirmative determination is made. Consequently, if an affirmative determination is made, then, the process of step 122 is performed.

In step 122, the security function regarding the condition that "a key is not inserted in an ignition key cylinder and the ignition is in an on-state" for activating the alarm 18 is cancelled, and the activation thereof is changed to an unvigilant state, and, on the other hand, the security function regarding the condition of "injustice unlocking and injustice door opening of a vehicle door, a luggage door and a vehicle bonnet" is maintained, and a process of maintaining the activation thereof in a vigilant state is performed.

In step 124, it is determined whether or not the stop signal from the receiver 20 of the remote engine starter 10 is received. The process of step 124 is repeatedly performed until an affirmative determination is made. Consequently, if an affirmative determination is made, then, the process of step 126 is performed.

In step 126, a process is performed to restore the security function regarding the condition that "a key is not inserted in an ignition key cylinder and ignition is in an on-state" and return the activation of the alarm 18 according to the condition to the vigilant state. After the process of step 126 is ended, the routine at this time is ended.

According to the routine shown in FIG. 4, when the start signal is supplied to the vehicle antitheft device 12 through the communication line 36 from the remote engine starter 10 side, the activation of the alarm 18 corresponding to the third theft mode concerning the an engine starting system, while the activation of the alarm 18 corresponding to the first and second theft modes concerning the vehicle intrusion system is maintained in the vigilant state. Since the supply of starter signal from the remote engine starter 10 to the vehicle antitheft device 12 is performed before supply of the contact point closing signal to the ignition relay 26 from the remote engine starter 10, the change to the unvigilant state with respect to the activation of the alarm 18 corresponding to the third theft mode by the vehicle antitheft device 12 is performed before the vehicle antitheft device 12 detects the ignition-on.

Therefore, according to the system of the present embodiment, when the remote engine start using the remote engine starter 10 is performed, the erroneous alarming and the erroneous warning by the alarm 18 due to the engine start can be avoided and the activation (alarming state) of the alarm 18 corresponding to the vehicle intrusion system can be maintained from the time that operation of the remote engine starter 10 is performed until a vehicle occupant actually gets on the vehicle, which maintains the antitheft property of the vehicle high. Thus, according to the system of the present embodiment, is possible to prevent the security regarding vehicle theft from being significantly deteriorated while avoiding an erroneous activation of the alarm 18 when the remote engine start using the remote engine starter 10 is performed.

Moreover, according to the routine shown in FIG. 4, when the stop signal is supplied to the vehicle antitheft device 12 from the remote engine starter 10 side through the communication line 36 under the situation where the unvigilant state is achieved with respect to the activation of the alarm 18 corresponding to the third theft mode concerning the engine starting system, the activation of the alarm 18 corresponding to the third theft mode can be returned to the vigilant state. For this reason, according to the system of the present embodiment, after the engine stop using the remote engine starter 10 after an engine start is performed, the security regarding vehicle theft including the third theft mode concerning the engine starting system can be maintained high.

Moreover, since the supply of the stop signal from the remote engine starter 10 to the vehicle antitheft device 12 is performed after the supply of the contact point opening signal to the ignition relay 26 from the remote engine starter 10 is performed, the change from the unvigilant state to the vigilant state with respect to the activation of the alarm 18 corresponding to the third theft mode by the vehicle antitheft device 12 is performed after the vehicle antitheft device 12 detects an ignition-off. Therefore, according to the system of the present embodiment, when the remote engine stop using the remote engine starter 10 is performed, it is possible to avoid the erroneous alarming and the erroneous warning by the alarm 18 due to the engine stop.

It should be noted that, in the above-mentioned first embodiment, the transmitter 22 corresponds to "predetermined transmitter", the receiver 20 corresponds to "in-vehicle receiver", the remote engine starter 10 corresponds to "remote start device" and "remote stop device", the vehicle antitheft device 12 corresponds to "antitheft device", and the ignition relay 26 corresponds to "ignition", respectively.

Moreover, in the above-mentioned first embodiment, "partly stopping means" and "first step" are realized by the vehicle antitheft device 12 performing the above-mentioned process of step 122 in the routine shown in FIG. 4, and "restoring means" and "fourth step" are realized by the vehicle antitheft device 12 performing the process of step 126 after performing the process of step 124, respectively. Moreover, "second step" is realized by the receiver 20 of the remote engine starter 10 performing the process of step 106 in the routine shown in FIG. 3, and "third step" is realized by the receiver 20 performing the process of step 110, respectively.

A description will now be given, with reference to FIG. 5 through FIG. 7 and also FIG. 1, of a second embodiment of the present invention.

In the above-mentioned first embodiment, since the receiver 20 of the remote engine starter 10 and the vehicle antitheft device 12 are connected through the communication line 36, it can be detected from the start signal from the remote engine starter 10. On the other hand, the system according to the present system is applied to a structure in which the receiver 20 of the remote engine starter and the vehicle antitheft device are not connected, in consideration of the fact that a commercially available one can be used as the remote engine starter.

Figure 5:
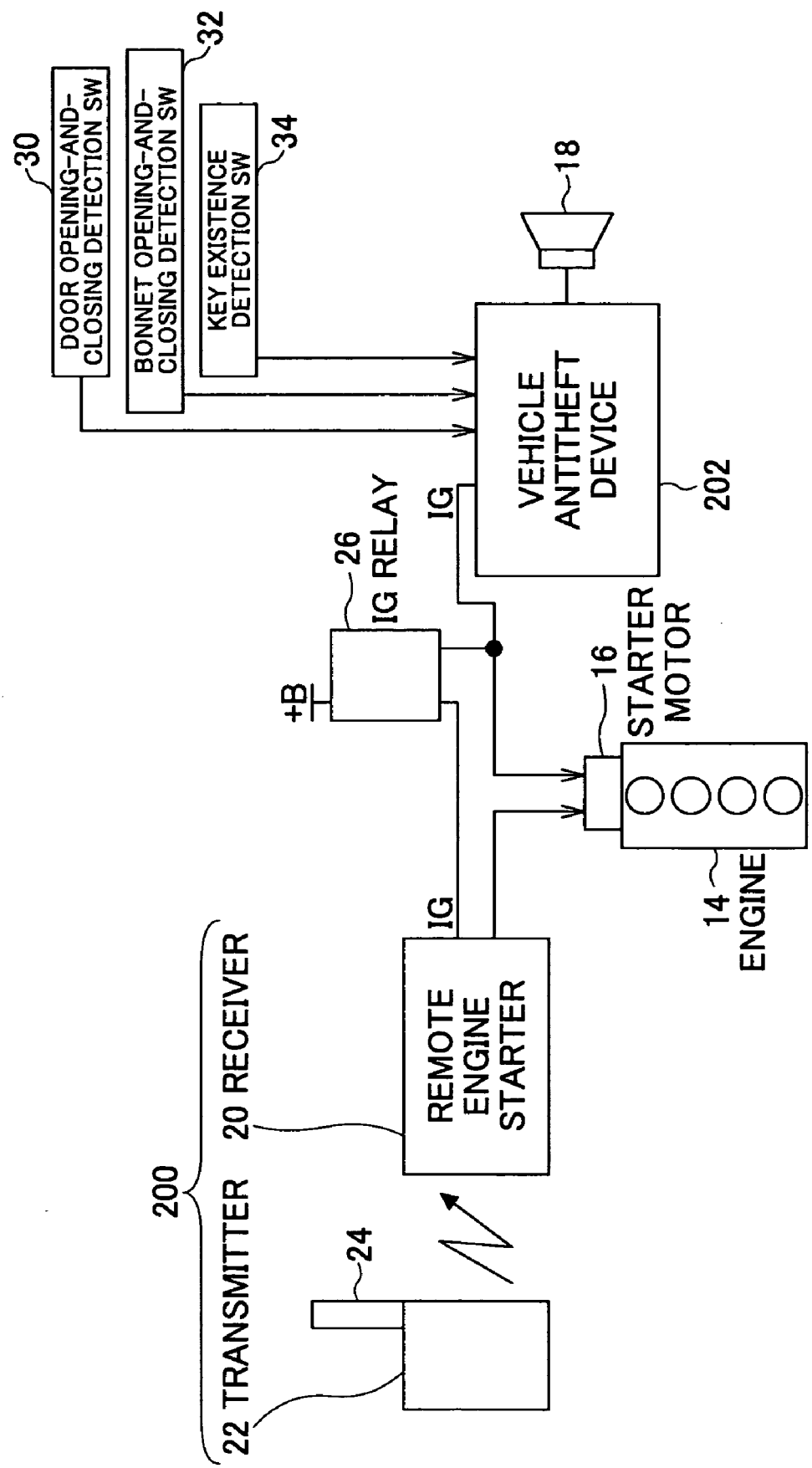
FIG. 5 is a constitutive diagram of a system according to a second embodiment of the present invention.

FIG. 5 is a constitutive diagram of a system mounted on the vehicle of the present embodiment. It should be noted that, in FIG. 5, parts that are the same as the parts shown in FIG. 1 are given the same reference numerals, and descriptions thereof will be omitted or simplified. In the present embodiment, the vehicle is equipped with a remote engine starter 200 and a vehicle antitheft device 202. The remote engine starter 200 is connected with the starter motor 16 and the ignition relay 26. The remote engine starter 200 is equipped with the receiver 20 and the transmitter 22 so as to supply a signal for closing the contact point to the ignition relay 26 when an engine start signal from the transmitter 22 is received by the receiver 20 and supply a signal for opening the contact point to the ignition relay 26 when an engine stop signal from the transmitter 22 by the receiver 20. The remote engine starter 200 is a device that can cause the engine of the vehicle by actuation of the starter motor 16 remotely from a position away from the vehicle by, for example, about 300 m.

Moreover, the alarm 18 is connected to the vehicle antitheft device 202. The vehicle antitheft device 202 is also connected with the door opening-and-closing detection switch 30, the bonnet opening-and-closing detection switch 32 and the key existence detection switch 34. The vehicle antitheft device 202 detects an open/close state of each vehicle door, the luggage door and the vehicle bonnet based on the output signal of the switches 30, 32 and 34, and determines whether or not the ignition key is inserted in the ignition key cylinder. A vehicle antitheft device 202 is also connected to the contact point of the ignition relay 26 so as to determine whether or not the ignition is turned on based on a signal supplied form the ignition relay 26. The vehicle antitheft device 202 is a device that changes between unvigilant state→vigilant state→alarming state→unvigilant state in the same condition as the above-mentioned vehicle antitheft device 12 of the first embodiment and, when there is a possibility of occurrence of theft of the vehicle, prevents the theft by activating the alarm 18.

In the system of the present embodiment, the remote engine starter 200 and the vehicle antitheft device 202 are not connected with each other. In this structure, the vehicle antitheft device 202 cannot perform cancellation and restore some of the security functions by the start signal and the stop signal from the remote engine starter 200 like the above-mentioned first embodiment. Thus, since, when the remote engine start using the remote engine starter 200 is performed, the ignition-on state (third theft mode) can be realized by an output of a high-level signal by the ignition relay in the state where the ignition key is not inserted in the ignition key cylinder, there is a possibility of occurrence of erroneous activation by the alarm 18 of the vehicle antitheft device 202.

Figure 6:
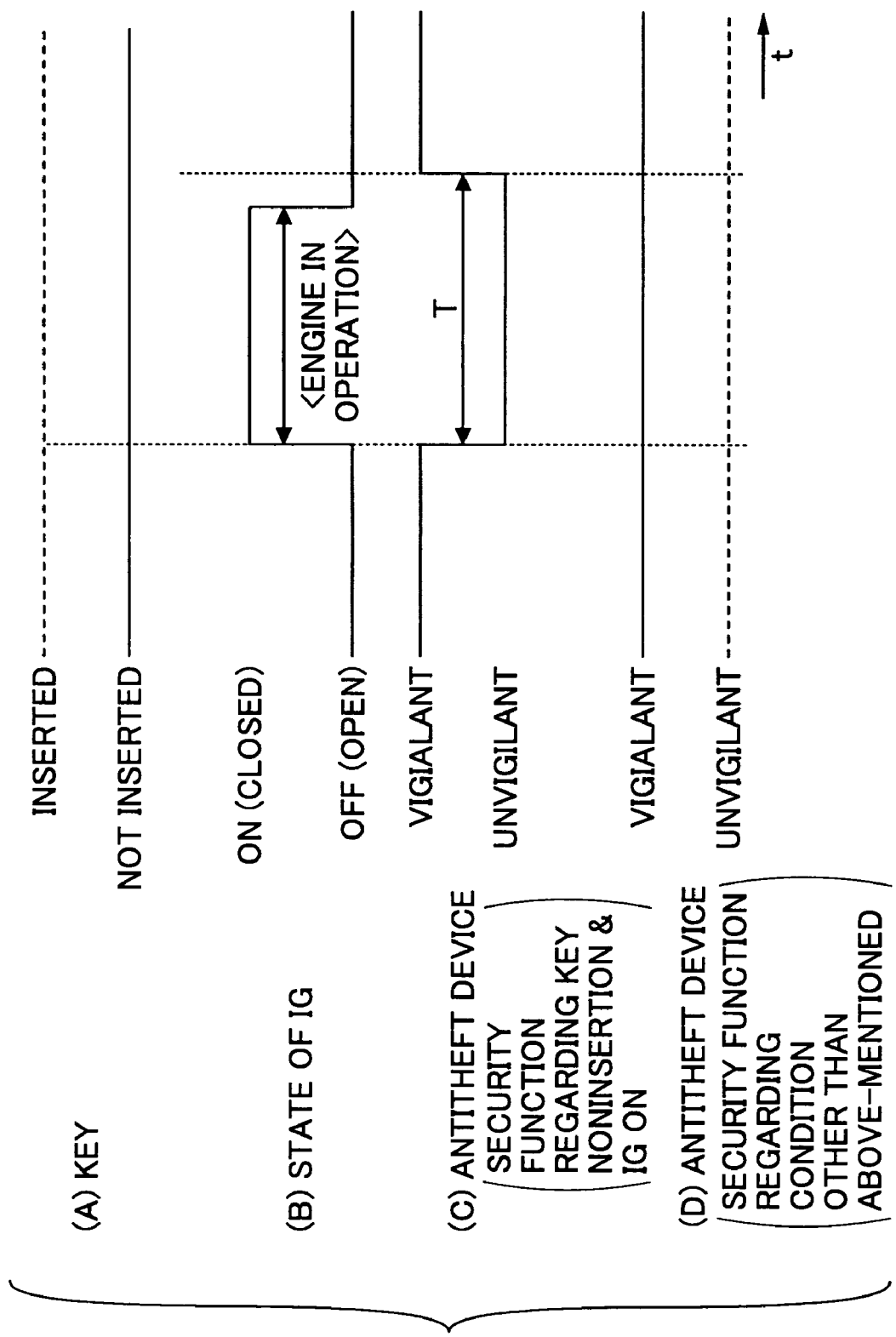
FIG. 6 is an operation time chart of a process which the system shown in FIG. 5 performs.

FIG. 6 is a diagram representing an operation time chart of the system of the present embodiment. The vehicle antitheft device 202 of the present embodiment ignores the condition regarding the third theft mode for a predetermined time T (for example, 10 minutes) without activating the alarm 18 after an ignition-on is first detected when the ignition key is not inserted in the ignition key cylinder, that is, the unvigilant state is set with respect to the activation of the alarm 18 corresponding to the third mode, and, on the other hand, the vigilant state is maintained with respect to the activation of the alarm 18 corresponding to the first and second theft modes.

In this structure, since the unvigilant state is realized only for the activation of the alarm 18 when the high-level signal is supplied from the ignition relay 26 in the state where the ignition key is not inserted in the ignition key cylinder even if an engine start using the remote engine starter 200 is performed, an erroneous activation of the alarm 18 due to the engine start can be avoided. Moreover, even when the unvigilant state is achieved with respect to the activation of the alarm 18 corresponding to the third theft mode by performing an engine start using the remote engine starter 200, the activation of the alarm 18 in a case where an opened state of the vehicle door, the luggage door and the vehicle bonnet is set, that is, the vigilant state is maintained with respect to the activation of the alarm 18 corresponding to the first and second theft modes concerning the vehicle intrusion system, and, thereby, if the engine start using the engine starter 200 is performed, thereafter, the alarming by the alarm 18 can be appropriately performed when an injustice intrusion into the vehicle is done until the vehicle door is unlocked by a normal method.

Thus, according to the system of the present embodiment, even when the remote engine starter 200 and the vehicle antitheft device 202 are not communicably connected, and if the remote engine start using the remote engine starter 200 is performed like the above-mentioned system of the first embodiment, an erroneous activation of the alarm 18 due to the engine start can be avoided, and the antitheft property of the vehicle can be maintained high during a period from a time when an operation of the transmitter 22 of the remote engine starter 200 by a vehicle occupant by the maintenance of the vigilant state by the alarm 18 corresponding to the vehicle intrusion system until the vehicle occupant actually gets on the vehicle. Thereby, it is possible to prevent the security regarding vehicle theft from being significantly deteriorated.

It should be noted that, in the structure of the present embodiment, even if a remote engine start is performed unjustly, the activation of the alarm 18 is not performed if the engine start concerned is a first time start, however, since the activation of the alarm 18 corresponding to the vehicle intrusion system is permitted, the alarming state by the alarm 18 is realized inconsideration of the fact that intrusion must be done to actually drive the vehicle, and it is said that the security regarding vehicle theft is maintained high.

Figure 7:
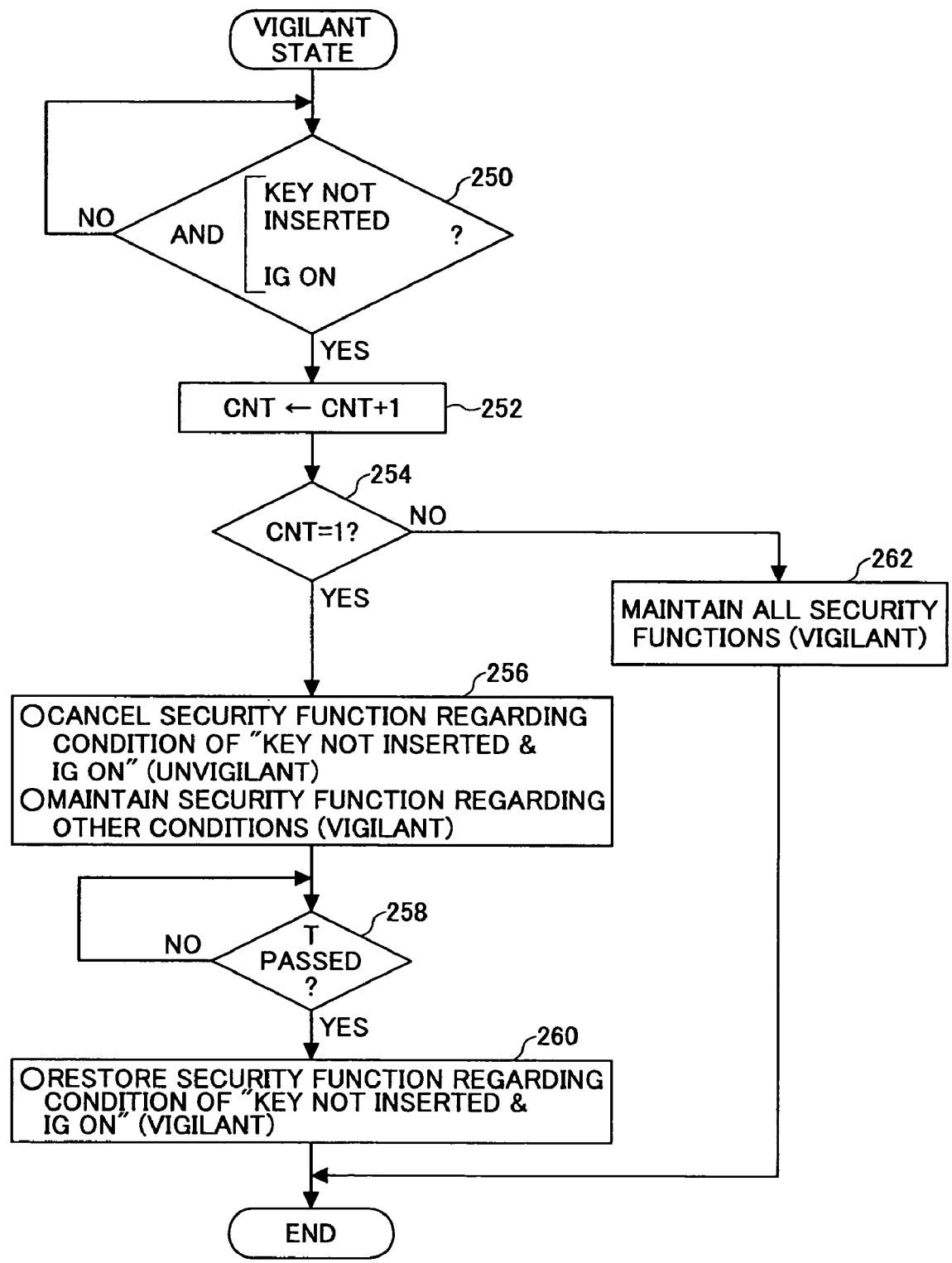
FIG. 7 is a flowchart of a control routine which the system shown in FIG. 5 executes.

FIG. 7 shows a flowchart of an example of a control routine which the vehicle antitheft device 202 of the present embodiment executes when the vigilant state is realized with respect to all security functions. The routine shown in FIG. 7 is repeatedly started each time the process is ended, and when the routine is started, the process of step 250 is performed first.

In step 252, a process of incrementing a counter CNT by "1" is performed. It should be noted that the counter CNT is a counter for counting a number of times when the ignition is set to an on-state in a state where the ignition key is not inserted in the ignition key cylinder, and is a counter which is reset when the unvigilant state is realized for all security functions, that is, when the ignition is turned on in a state where the vehicle door or the like is unlocked or opened by a normal method or the ignition key is inserted in the ignition key cylinder.

In step 254, it is determined whether or not the count value of the counter CNT incremented in the above-mentioned step 252 is "1". Consequently, if CNT=1 is established, it can be determined that the fact that the ignition is turned on in the state where the ignition key is not inserted in the ignition key cylinder is detected for the first time in the above-mentioned step 250. Therefore, if such a determination is made, then, the process of step 256 is performed.

In step 256, the security function regarding the condition that "a key is not inserted in an ignition key cylinder and the ignition is in an on-state" for activating the alarm 18 is cancelled, and the activation thereof is changed to an unvigilant state, and, on the other hand, the security function regarding the condition of "injustice unlocking and injustice door opening of a vehicle door, a luggage door and a vehicle bonnet" is maintained, and a process of maintaining the activation thereof in a vigilant state is performed.

In step 258, after the process of the above-mentioned step 256 is performed, it is determined whether or not a predetermined time T has passed. The process of step 258 is repeatedly performed until it is determined that the predetermined time T has passed. Consequently, if an affirmative determination is made, then, the process of step 260 is performed.

In step 260, a process is performed to restore the security function regarding the condition that "a key is not inserted in an ignition key cylinder and ignition is in an on-state" and return the activation of the alarm 18 according to the condition to the vigilant state. After the process of step 260 is ended, the routine at this time is ended.

On the other hand, if CNT=1 is not established, it can be determined that the detection of the ignition-on when the ignition key is not inserted in the ignition key cylinder by the above-mentioned step 250 is made at least twice. Therefore, if such a determination is made, the process of step 262 is performed. In step 262, a process of maintaining the vigilant state for all security functions is performed as usual. After the process of step 262 is ended, the routine at this time is ended.

According to the above-mentioned routine shown in FIG. 7, when the detection of the ignition-on is made, when the ignition key is not inserted in the ignition key cylinder, for the first time after a reset, the change is made to the unvigilant state with respect to the activation of the alarm 18 corresponding to the third theft mode concerning the engine starting system, and on the other hand, the vigilant state can be maintained with respect to the activation of the alarm 18 corresponding to the first and second theft odes concerning the vehicle intrusion system.

Therefore, according to the system of the present embodiment, when the remote engine starter 200 and the vehicle antitheft device 202 are not communicably connected with each other unlike the structure of the above mentioned first embodiment, and even if a remote engine start operation using the remote engine starter 200 is started, erroneous alarming and erroneous warning by the alarm 18 due to the engine start can be avoided, and the activation (alarming state) of the alarm 18 corresponding to the vehicle intrusion system can be acquired from the time when the operation of the remote engine starter 200 is performed until the vehicle occupant actually gets on the vehicle, which maintains the antitheft property of the vehicle high. Thereby, it is possible to prevent the security regarding vehicle theft from being deteriorated significantly while avoiding an erroneous activation of the alarm 18.

Moreover, according to the routine shown in FIG. 7, if the detection of the ignition-on is made, when the ignition key is not inserted in the ignition key cylinder, twice or more after reset, all the vigilant state can be maintained for all security functions as usual. Therefore, according to the system of the present embodiment, when a remote engine start is performed twice or more, it is possible to acquire high security regarding vehicle theft.

It should be noted that, in the above-mentioned second embodiment, the remote starter 200 corresponds to "remote start device", the vehicle antitheft device 202 corresponds to "antitheft device", respectively, and "partly stopping means" is realized by the vehicle antitheft device 202 performing the process of step 256 in the above-mentioned routine shown in FIG. 7.

By the way, although, in the above-mentioned second embodiment, setting an unvigilant state of the alarm 18 corresponding to the third theft mode by the predetermined time T when the ignition-on is detected when the ignition key is not inserted in the ignition key cylinder is performed only a the time of first detection, the present invention is not limited to this and the permission may be given until the detection is made for a predetermined number of times, and, thereafter, the change to the unvigilant state may not be performed so as to maintain the vigilant state. Moreover, it may be configured to make the predetermined time T changeable.

It should be noted that although in the above-mentioned firs and second embodiments, as the security function of the vehicle antitheft devices 12 and 202, the one regarding the first and second theft modes concerning the vehicle intrusion system is quoted other than the one regarding the third theft mode concerning the engine starting system, one regarding a theft mode of the vehicle intrusion system other than the first and second theft modes or one regarding a theft mode other than vehicle intrusion system may be quoted.

Moreover, although in the above-mentioned first and second embodiments the transmitter 22 is a portable transmitter which is carried by a vehicle occupant, the present invention is not limited to this and it may be a stationary-type transmitter installed in a building or the like.

From the description above, it will be understood that the above-described vehicle antitheft system includes a sensor(s) to detect attempted theft of the vehicle and a truth-table (logic) means for disabling anti-theft device as a function of sensor(s) outputs.

The present invention is not limited to the above-mentioned specifically disclosed embodiments, and variations and modifications may be made within the scope of the present invention.

The invention claimed is:

1. A vehicle antitheft system mounted to a vehicle, the system comprising:
   a remote start device to remotely start an engine, further comprising a start signal radio-transmitter and an in-vehicle radio-receiver;
   a vehicle anti-theft device operatively coupled to the remote start device,
   a starter-motor relay,
   a sensor to detect attempted theft of the vehicle; and
   logic means for disabling the anti-theft device as a function of sensor outputs from the sensor before an engine start when said start signal is received by said in-vehicle radio-receiver.

2. The vehicle antitheft system as claimed in claim 1, comprising
   a remote stop device that stops the engine when a stop signal radio-transmitted from a stop-signal radio-transmitter is received by said in-vehicle radio-receiver, and
   logic means for restoring the antitheft device after an engine stop by said remote stop device is performed when said stop signal is received by said in-vehicle radio-receiver.

3. The vehicle antitheft system as claimed in claim 1, wherein an antitheft function stopped by said logic means for disabling the anti-theft device is a function to give warning upon detection that an ignition is turned on, in a state where a key is not inserted in an ignition key cylinder of the vehicle.

4. A vehicle antitheft system mounted to a vehicle, the system comprising:
   a remote start device to remotely start an engine, further comprising a start signal radio-transmitter and an in-vehicle radio-receiver;
   a vehicle anti-theft device operatively coupled to the remote start device,
   a starter-motor relay,
   a sensor to detect attempted theft of the vehicle; and
   logic means for disabling the anti-theft device as a function of sensor outputs from the sensor for a predetermined time period after an occurrence of the attempted theft of the vehicle.

5. The vehicle antitheft system as claimed in claim 4, wherein an antitheft function stopped by said logic means for disabling the anti-theft device is a function to give warning upon detection that an ignition is turned on, in a state where a key is not inserted in an ignition key cylinder of the vehicle.

6. A control method of a vehicle equipped with a remote start device for starting a vehicle engine when a start signal radio-transmitted from a radio-transmitter is received by an in-vehicle radio-receiver and an antitheft device for preventing theft of the vehicle, the method comprising:
   a first step of stopping a theft preventing function by said antitheft device when said start signal is received by said in-vehicle radio-receiver; and
   a second step of starting the vehicle engine by said remote start device after the antitheft function is stopped by said antitheft device.

7. The control method as claimed in claim 6, wherein
   said vehicle is equipped with a remote stop device that stops the engine when a stop signal radio-transmitted from said radio-transmitter is received by said in-vehicle radio-receiver, and the control method includes:
   a third step of performing an engine stop by said remote stop device when said stop signal is received by said in-vehicle receiver; and
   a fourth step of restoring the antitheft function corresponding to said part of the theft modes by said antitheft device after an engine stop by said remote stop device is performed by said third step.

8. The vehicle antitheft system as claimed in claim 1, wherein the sensor includes at least one of an inserted ignition-key sensor, a door-open sensor, and a hood-open sensor.

9. The vehicle antitheft system as claimed in claim 8, wherein the anti-theft device detects at least one of theft modes consisting of:
   unlocking a vehicle door or a luggage door without inserting an ignition key into an ignition key cylinder and without completing code collation between a wireless door locking/unlocking device and a portable device;
   opening any door or the vehicle bonnet that is locked; and
   activating an ignition relay when the ignition key is not inserted in the ignition key cylinder.

10. The vehicle antitheft system as claimed in claim 4, wherein the sensor includes at least one of an inserted ignition-key sensor, a door-open sensor, and a hood-open sensor.

11. The vehicle antitheft system as claimed in claim 10, wherein the anti-theft device detects at least one of theft modes consisting of:
    unlocking a vehicle door or a luggage door without inserting an ignition key into an ignition key cylinder and without completing code collation between a wireless door locking/unlocking device and a portable device;
    opening any door or the vehicle bonnet that is locked; and
    activating an ignition relay when the ignition key is not inserted in the ignition key cylinder.

* * * * *